June 17, 1952  R. C. CASTLEN  2,600,732
INDICATOR-TYPE ADAPTER FOR BATTERY CELL CAPS
Filed April 5, 1950
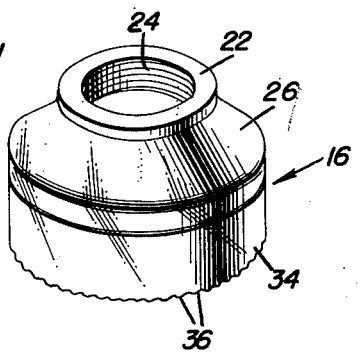
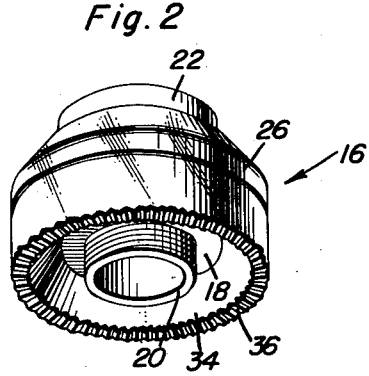
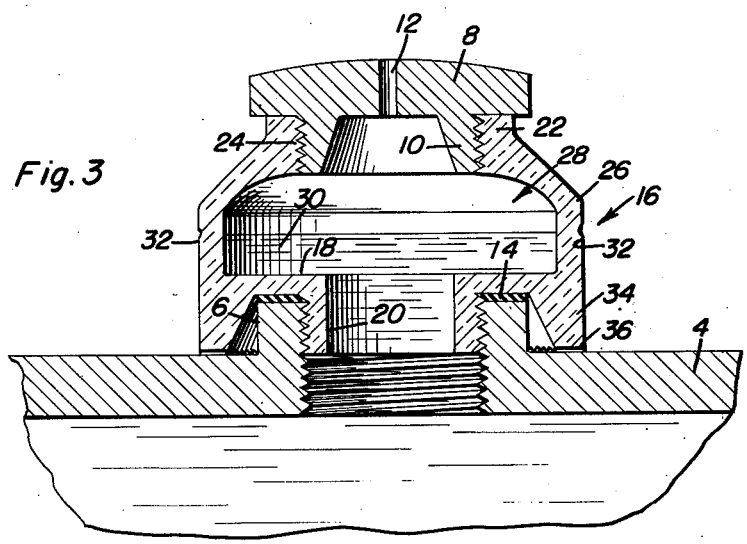
Robert C. Castlen
INVENTOR.

Patented June 17, 1952

2,600,732

UNITED STATES PATENT OFFICE 2,600,732

INDICATOR-TYPE ADAPTER FOR BATTERY
CELL CAPS

Robert C. Castlen, West Palm Beach, Fla.

Application April 5, 1950, Serial No. 154,156

2 Claims. (Cl. 136—177)

The present invention relates to ways and means whereby the level of the electrolyte in a conventional automobile storage battery may be periodically checked to make sure that the casing is fully and properly charged with electrolyte at all times.

Needless to say, many and varied types and forms of indicators have been devised by others and are employed for checking the electrolyte level from time to time. Various types of electrodes, contacts and other immersion devices are used. These usually incorporate some sort of a signaling device such as an audible or visible signal on the instrument panel. There are other devices wherein the indicating means is embodied in the screw cap by especially constructing the latter. For instance, one type utilizes a window whereby the observer may look through same and thus check, unsatisfactorily of course, the approximate electrolyte level.

The purpose of the present invention is to structurally, functionally and otherwise improve upon known liquid level indicators. More specifically, it is an object of the invention to provide a simple and practical adaptation in which manufacturers, users and others will find their essential requirements fully met, contained and readily available.

In reducing to practice a preferred embodiment of the present invention, I have found it expedient and practicable to utilize a special adapter which is made of transparent material and which may be installed or interposed between customary screw-type filler neck on the battery casing and the usual screw-plug which is designed to be mounted on said neck.

To briefly summarize, the preferred embodiment of the invention has to do with a simple and expedient bottle-like device which is constructed of appropriate transparent material, which has a neck to be coupled with the usual filler neck on its bottom side and has a screw-threaded opening in its top to accommodate and hold in the place the customary battery cap. The body portion is hollow and fashioned into a well which, when charged with the electrolyte to a predetermined point, enables one to make periodical inspections and to thus keep abreast the actual liquid level conditions in each of the thus improved battery cells.

Other objects and advantages will become more readily apparent from the following description and the accompanying illustrative drawings.

In the accompanying sheet of drawings, wherein like numerals are employed to designate like parts throughout the views:

Fig. 1 is a perspective view of the attachment type adapter constructed in accordance with the principles of the present invention;

Fig. 2 is a second perspective view wherein the adapter is poised at an angle to enable the observer to see the construction of the basal portion of the adapter; and Fig. 3 is a view of a fragmentary sectional type showing a portion of the battery casing, the usual filler neck, usual screw-cap and the indicator-type adapter interposed between the cap and neck.

Referring now to the drawings by distinguishing reference numerals and lead lines, the numeral 4 designates the storage battery case which, as is obvious, is conventional. It includes the usual filler neck 6 which in actual practice is adapted to accommodate the usual screw-cap 8. The cap has a suitable screw-threaded neck portion 10 which is adapted to screw into the neck 6. The numeral 12 denotes the usual vent hole in the cap. Also, the numeral 14 designates a gasket which is, if desired, employed for efficiency of the over-all arrangement.

The invention takes the form of an attachment and this is more specifically in the nature of a one-piece special adapter unit 16. One looking at the unit in Figs. 1 and 2 would almost visualize it as though it were, let us say, an ink bottle. Actually, it does not have to be bottle-shaped but is preferably so. The bottom of the adapter, the part 18 is provided with a screw-threaded neck 20 which is adapted to screw into the filler neck 6. The restricted upper end portion, also a neck 22, is screw-threaded, as at 24, to accommodate the neck on the usual screw-cap 8. The main or body portion 26 is formed into an appropriate receptacle or trap 28 into which the liquid electrolyte 30 is adapted to flow. The numerals 32 denote an appropriate level denoting groove or the like. The remaining element of the adapter takes the form of an annular skirt or flange 34 and this depends below the bottom 18 and concentrically surrounds the neck 20 and is adapted to rest on the battery case 4. The lower edge of said flange is serrated to provide anti-slipping teeth 36.

In practice, the neck 20 of the adapter 16 is screwed into the filler neck 6 after the cap 8 has been, obviously, removed. Now, the device is in place with liquid-tight contact obtained between the bottom 18 and neck 6 by way of the gasket or packing 14. Stability is provided by the flange 34 and tendency to accidentally turn is guarded against by the teeth 36 on the flange 34 contacting the surface of the battery casing. With the adapter in position and assuming that the neck 22 is then uncovered, the electrolyte or battery water is funneled or otherwise delivered into the battery and instead of letting it come just above the usual plates (not shown) it is allowed to flow up through the neck 6 and into the indicated well 28. When it reaches the level line 32 no further liquid is needed. Now, with the cap 8 back in place as shown in Fig. 3 the device is ready to fulfill the requirements of the user in that it will enable him to check from time to time and ascertain the liquid level and when to replenish the supply.

The invention has a number of advantages in that it provides a readily visible means of determining if the fluid in each cell of the battery needs replenishing. It is a simple filler device and is itself filled for adding water to the battery cells. It provides space to accommodate displaced battery fluid due to expansion of the fluid above the battery plates. What is more, it provides means which eliminates explosive gas accumulation in the top of the battery cell in that the water rises into the indicating well 28.

In the invention the user will find means for battery fluid to mix with added fluid, thereby lowering the freezing point of the reserve fluid as well as the guide line on the device to indicate the filling limit. Then too, means is had which assures that the battery plates are covered by fluid at all times, thereby allowing the battery to render longer than average service. By providing the anti-slipping teeth 36 on the skirt or flange 34 an effective joint is had and this minimizes the likelihood of liquid leakage. If desired, the space or channel between the neck 6 and skirt 34 may be packed with a sealing compound (not shown) to permanently anchor the complete assemblage on the battery 4.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

Having described the invention, what is claimed as new is:

1. A storage battery embodying a casing having a conventional-type upstanding internally screw-threaded filler neck, a conventional type screw-cap having a nipple portion adapted to be screwed into said neck, and an adapter for said screw-cap, said adapter having a transparent receptacle portion constituting a liquid level indicating well, being provided at the center of its bottom with a depending screw-threaded nipple corresponding in diameter to the nipple on said screw-cap, said depending nipple being screwed into said filler neck and serving to attach said adapter removably to said battery casing, the upper portion of said adapter having a second internally screw-threaded filler neck in axial alignment with said first-named filler neck and of an internal diameter corresponding to the internal diameter of the first-named filler neck, the nipple on said screw-cap being removably screwed into said second-named filler neck, the bottom portion of said adapter being provided with an annular depending flange, said flange constituting a skirt, the lower edge portion of said skirt resting directly on the battery casing and said skirt concentrically surrounding said first-named filler neck and having its inner peripheral edge spaced from the outer peripheral edge of said first-named filler neck and providing a space, said space being adapted, whenever necessary or desired, to receive an adhesive sealant compound, whereby to positively secure said adapter to said neck and battery casing.

2. An attachment for a storage battery filler neck comprising an adapter unit having a circular body portion defining a well, said body portion having a flat bottom which is centrally apertured and provided with a depending, externally screw-threaded attaching neck, said attaching neck being adapted to be screwed into the usual filler neck on a battery casing, the lower portion of said body also having an annular depending flange, said flange constituting a skirt, said skirt depending from the bottom and concentrically surrounding said attaching neck in spaced relation, the upper portion of said body portion being of frusto-conical form and including an internally screw-threaded auxiliary filler neck, the latter being adapted to accommodate the screw-threaded nipple portion of a conventional storage battery screw-cap, the lower edge portion of said skirt being serrated and providing radial anti-slipping teeth adapted to bite into a cooperating surface of said battery casing.

ROBERT C. CASTLEN.

REFERENCES CITED

The following references are of record in the file of this patent:

UNITED STATES PATENTS

| Number | Name | Date |
| --- | --- | --- |
| 2,053,353 | Talbot | Sept. 8, 1936 |
| 2,055,645 | Allen | Sept. 29, 1936 |
| 2,212,368 | Hodge | Aug. 20, 1940 |
| 2,306,974 | Oestermeyer et al. | Dec. 29, 1942 |
| 2,436,465 | Wilson | Feb. 24, 1948 |
| 2,490,149 | Mosher | Dec. 6, 1949 |

FOREIGN PATENTS

| Number | Country | Date |
| --- | --- | --- |
| 118,834 | Australia | Aug. 31, 1944 |
| 810,291 | France | Mar. 18, 1937 |